Nov. 7, 1933.    J. STÖCKLIN    1,934,215
PROTECTIVE RELAY
Filed July 25, 1931
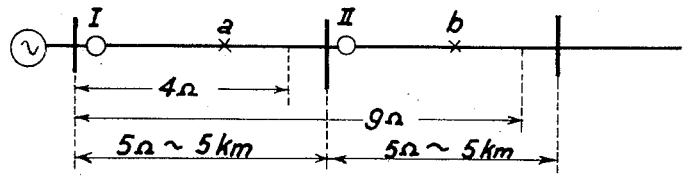
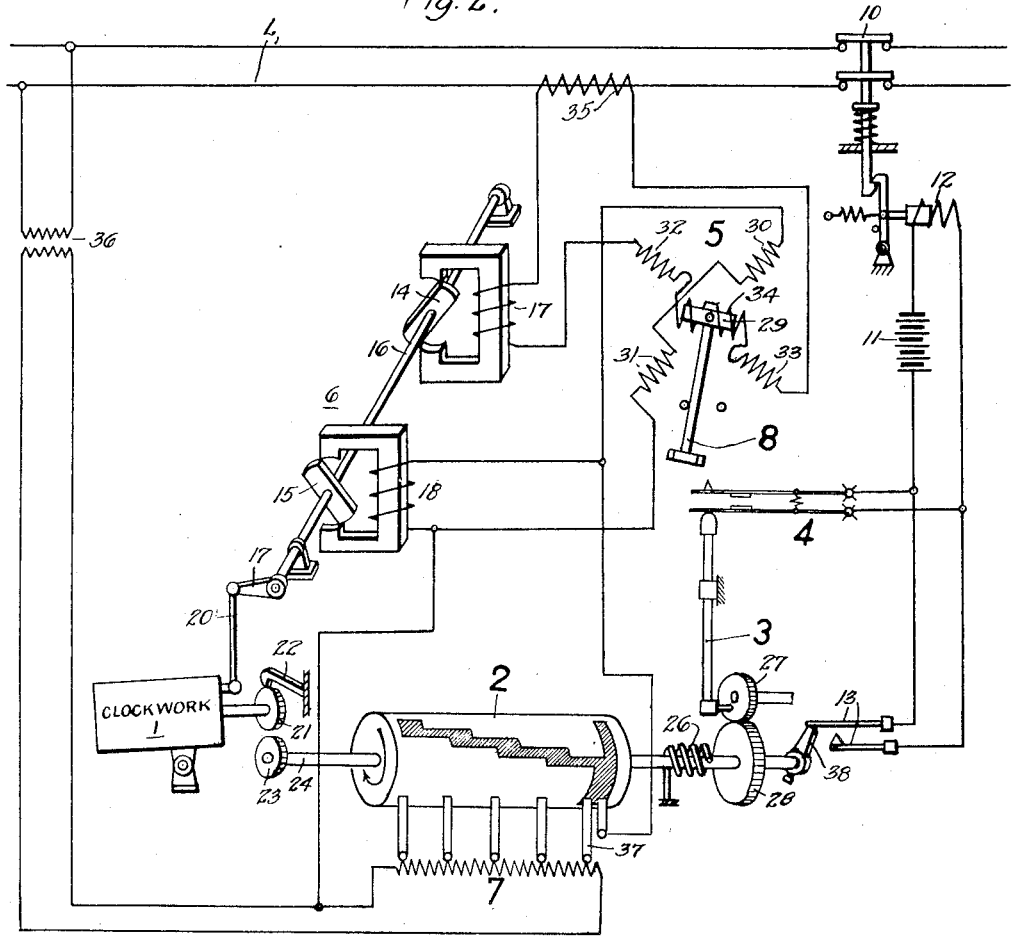
INVENTOR
JOSEF STOCKLIN
BY *Alfred H. Dyson*
ATTORNEY Patented Nov. 7, 1933

1,934,215

UNITED STATES PATENT OFFICE 1,934,215

PROTECTIVE RELAY

Josef Stöcklin, Zurich, Switzerland, assignor to Aktiengesellschaft Brown Boveri & Cie, Baden, Switzerland, a joint-stock company of Switzerland Application July 25, 1931, Serial No. 553,130, and in Switzerland July 26, 1930

4 Claims. (Cl. 175—294)

This invention relates to protective relays, and it has particular reference to relays arranged to discriminately disconnect sections of an electric circuit, such as a distribution or transmission line, in accordance with the impedance of the circuit so that the sections of the circuit which are nearest a fault connection are first disconnected leaving the fault free sections of the circuit in operation.

Such relays are known in the art as "distance" relays and are usually arranged to vary the "tripping" times of the circuit breakers joining the sections of the circuit in accordance with the impedance of the circuit from the point of connection of the relays with the circuit to the point of a fault connection therein, thereby causing the circuit breaker nearest to the fault connection to automatically disconnect the faulty section. Relays of this type generally include, (a) a "timing" element arranged to be started into movement upon the occurrence of a fault connection in the circuit and to continue in movement at a predetermined rate, (b) a "starting" element for initialing movement of the timing element, which is usually arranged to be operatively actuated responsive to reduction of the impedance (either resistance or reactance) to a predetermined value, (c) a "time-delay" element for controlling the extent (time) of movement of the timing element—and thus the tripping time of the associated circuit breaker—which is usually formed as a cam adjustable to various positions responsive to operative actuation of (d) an ohmmetric element arranged to be operable responsive to the impedance (either resistance or reactance) of the circuit from the point of connection of the relay to the point of a fault connection therein; and (e) a circuit closing element which usually comprises a pair of contact members arranged to be closed by the timing element upon movement thereof into connection with the time-delay element. According to the position of the cam, i. e. according to the impedance measured by the relay, the distance to be travelled by the timing element varies and by these means the tripping time of the circuit breaker depends upon the magnitude of the impedance in a manner determined by the shape of the cam. Relays of this description have the disadvantage that the time necessary for the cam to reach its position, is too long for practical requirements.

A principal feature of the present invention is, therefore, to provide a relay in which the above described disadvantage is overcome by a construction which, instead of requiring the time-delay element to turn through a relatively large angle enables this element to turn through only a small angle. For this purpose in accordance with the present invention, the sensitivity of the relay is altered in steps during its operation by auxiliary contacts which are conveniently arranged to be closed by the timing element. An alternative method according to this invention is to compensate the movement of the time-delay element in such a manner that it will deviate in one (negative) direction from zero as long as the impedance or, as the case may be, the reactance does not exceed a given magnitude, but which will deviate in the opposite (positive) direction as soon as the given value is exceeded. The device may, in accordance with the invention, be arranged so that with a value of the impedance resulting in a negative deviation of the instrument, a momentary closing of the contacts of the relay will occur while with a positive deviation the contacts are either not closed at all or are closed only after a period of time which may be adjusted.

This cycle of operation of the relay will according to the invention be repeated a number of times, each time a new, and usually a higher, value of impedance which corresponds to the zero position of the instrument is inserted by auxiliary contacts operated by the timing element. The elapsed time between each successive cycle may be chosen as desired to meet the requirements of practice. A cycle is to be understood as the movement of the timing element against the time-delay element deviated by the ohmmetric element. The contacts are closed in each cycle in which a negative deviation from the zero position occurs.

The foregoing and other features of the invention will be apparent from the following description when read in connection with the accompanying drawing in which Fig. 1 is a single-line wiring diagram of a portion of an electric circuit utilizing protective relays embodying my invention; and Fig. 2 is a diagrammatic view of a protective relay embodying my invention, and the circuits associated therewith.

Referring to Fig. 1 of the drawing and assuming that the relay I, which measures the resistance, is balanced so that in the first operating cycle a value of 4 ohms, which in the example chosen represents a distance of 4 kilometers to a short circuit fault i. e. 80% of the distribution section, will cause the time-delay element to deviate in a negative direction while auxiliary contacts insert a value of 9 ohms for the second operating cycle. Should, for example, a short circuit occur at *a*, the time-delay element of relay I will deviate in a negative direction. As a result the movement of the timing element is opposed by the time-delay element. This causes the circuit closing to be momentarily closed whereupon relay I trips its circuit breaker. The short circuit is therefore cleared as far as relay I is affected and the relay returns to its normal position.

Should, however, a short-circuit occur at *b* the impedance magnitude of 4 ohms with which the relay is compensated during its first operating cycle is exceeded and the time-delay element deviates in a positive direction permitting movement of the timing element to continue without causing the contacts 4 to be closed, and by the continuing operation of the actuating means thereof the timing element is returned to its normal position. Since the short circuit still exists, the relay begins its second operating cycle after the adjusted time, e. g. after one second measured from the instant of commencement of the fault. In the meantime again with the aid of auxiliary contacts operated by the timing element, a new impedance value is inserted to balance the relay, this having a value of 9 ohms in the present example. Since the impedance measured by the relay in its second operating cycle is less than 9 ohms, the time-delay element deviates in a negative direction, causing the movement of the timing element to actuate the circuit closing contacts to circuit closing position. In actual practice a further relay would be placed in the position II which relay would trip its circuit breaker during its first operating cycle. Relay I would then not close its circuit closing contacts at all, or would only close them after a second had passed if relay II failed to operate. The repetition of the operating cycles which have been described may be made to occur as often as is desired. It may also be arranged, that by continuing operation of the timing element actuating means, the relay will cause tripping of the circuit heater after a given number of cycles, totally independent of the resistance measured.

Referring now to Fig. 2 of the drawing as illustrating one embodiment of my invention, I have shown adjoining sections of an electric circuit L joined together by a circuit breaker 10 that is arranged to be tripped to circuit opening position by a circuit, including a suitable source of current, such as a battery 11, and a tripping magnet 12, which may be energized by closing a pair of contact members 4, or a pair of contact members 13.

The closing and opening of the contact members 4, controlling the tripping of the circuit breaker 10, is regulated by the relay device comprising an impedance responsive element 6 for determining whether or not the circuit breaker 10 shall be tripped, and another impedance or reactance responsive element 5 which determines how long after the actuation of the control impedance element 6 the circuit breaker shall be tripped.

The elements 5 and 6 for controlling the actuation of the tripping mechanism and for controlling the time-delay of the tripping action, may, of course, be constructed in a variety of ways to produce the resulting effects set forth above.

In the arrangement illustrated in Fig. 2 of the drawing the tripping, or actuating, element 6 comprises two soft iron armatures 14, 15 mounted on a common spindle 16 to rotate the same in opposite directions, respectively, in response to the differential action of the line current, flowing through coil 17 co-operating with one of the armatures, and a potential proportionate to line voltage, which energizes coil 18 cooperating with the other armature respectively. Since the current actuated armature 14 and the voltage actuated armature 18 tend to rotate the spindle 16 in opposite directions, the deflection or the position of the spindle will be determined by the ratio of the voltage to the current, which is a measure of the line impedance.

The spindle 16 carries an arm 17 which controls, through a link 20, the tilting of a suitable timing mechanism such as a clockwork 1, to cause the disengagement of a pinion 21 carried thereby from a fixed latch 22 to release the clockwork mechanism, and the engagement of the pinion with gear 23, carried on the spindle 24, to rotate the contact drum 2 and gear 28 carried on the spindle 24, in a clockwise direction. The impedance element 6 is so adjusted that when the ratio of the voltage to current $\frac{E}{I}$ is normal, that is when the line is free from short circuit or other faults, the opposing actions of the current and voltage elements 14, 15 will maintain the arm 17, link 20 and timing mechanism 1 in such position as to retain the pinion 21 in engagement with the latch 22, to lock the clockwork against operation, and out of engagement with the gear 23, so that the spindle 24 and the parts carried thereby will be retained, in their normal position by the action of a spring 26, i. e. in the position shown in the drawing. However if the impedance of the line should drop by reason of a fault occurring therein, the arm 17 will be so rotated that the pinion 21 of the timing, or clockwork, mechanism comes into engagement with the gear 23 moving thereby the spindle 24 and the parts carried thereby in a clockwise direction against the opposing action of spring 26, thus bringing into action the timing element 3 by virtue of rotation of gear 27, through engagement thereof with pinion 28.

As shown in the drawing the time-delay element 8 is included as a member of the ohmmetric device of the cross coil type, designated generally by the reference numeral 5 and includes a soft iron armature 29 arranged in co-operative relation with a pair of voltage coils 30, 31 and a pair of current coils 32, 33, the latter being connected in series with a coil 34 surrounding the armature 29 to magnetize the latter. The current coils 32, 33, 34 of the device 5 and the current coil 17 of the device 6 may be energized in series from a current transformer 35 on the line L, while the voltage coils 30, 31 and 18 of the two devices 5, 6, may be energized in parallel from a tapped autotransformer 7, connected to be energized from a potential transformer 36 connected across the line L.

The time-delay element 8 will be rotated in one and another direction into and out of the path of movement of the pivoted circuit closing springs 4 depending on direction of flow of energy in the line L and in extent in dependence on the ratio of the voltage to the current acting on the armature 29, so that the position of element 8 is also controlled by the impedance of the line or of reactance (as desired).

Reverting now to Fig. 1 of the drawing and assuming a short circuit to occur in the line L at the point *a*, the impedance of the line will drop to a value of 4 ohms (in the example assumed) and the arm 16 will be so rotated that the pinion 21 moves from engagement with the latch 22, permitting operation of the clockwork, and comes into engagement with the gear 23 causing rotation of spindle 24 and the parts carried thereby at a constant rate in a clockwise direction. At the same time the ohmmetric element 5 is energized in such sense as to move the time-delay element 8 in the negative direction from its normal position and into the path of movement of the circuit closing springs 4 which are thereafter closed by the continuing movement of the timing element effecting thereby closure of the circuit breaker tripping circuit during the first cycle of movement of the timing element 3 in a period of time in dependence upon the adjusted rate of movement of the spindle 24 by the clockwork mechanism 1. Should, however, the fault connection occur at the point b then the impedence of the line, from the point of connection of the relay to the point of the fault connection, will be, in the example assumed, nine ohms instead of four ohms, with the result that the time-delay element 8 will be moved in a positive direction from its normal position out of the path of movement of the circuit closing springs during the first cycle of operation of the timing element. By the continuing movement, however, of the drum 2 the tap connections 37 of the auto-transformer winding 7 are so altered as to reduce the voltage impressed on the voltage coils 30, 31, to an extent such as to compensate the ohmmetric element 5 to the extent of 5 ohms, i. e. equivalent, in the illustrated example, to one line section of 5 km., causing thereby the current coils 32, 33 to predominate, the time-delay element 8 to move in the negative direction into the path of movement of the circuit closing springs 4, and the closure of the circuit breaker tripping circuit (including battery 11 and tripping coil 12) during operation of the timing element 3 through its second cycle. Should the distance of the fault connection in the line L be at some point beyond the point b and the impedence of the line to such point of fault connection be, therefore, of some value greater than 10 ohms, then the time-delay element would be maintained in a position out of the path of movement of the circuit closing spring 4 until the movement of the drum 2 through a following cycle, or cycles, so alters the connections of auxiliary contacts 37 as to reduce the potential impressed on the voltage coils 18, 30, 31, by the auto-transformer 7, to extent as to result in predominance by the current coils 32, 33 and the movement of the time-delay element 8, in the negative direction, into the path of the circuit closing contacts 4, and the closure thereof by movement of the timing element during its following cycle of operation. Thus the ohmmetric element 5 is compensated during each cycle of operation of the timing element 3 thereby making it possible to reduce the angle of movement of the time-delay element 8 and, therefore, so increasing the sensitivity of the relay as to enable effective operation thereof in periods of time substantially in dependence upon any predetermined speed of operation of the timing element, i. e. within periods of time to meet the practical requirements.

Moreover, by the provision of the contact (overrun) members 13 and the closure thereof by the arm 38, adjustably secured on the spindle 24, the tripping circuit for the circuit breakers may be closed after a predetermined time totally independent of the impedance (resistance or reactance) measured by the relay.

Although I have illustrated one embodiment only of the invention and have described the elements 5 and 6 thereof as being ohmmetrically responsive, it will be obvious to those skilled in the art to whom the invention is directed that either, or each, of these elements may be so arranged and connected as to be current or wattmetrically responsive. Also that instead of automatically compensating the element 5 during each operating cycle by operation of the auxiliary contacts 37 to affect changes in the secondary voltage of the auto-transformer 7, such automatic compensation may be as readily accomplished by so arranging the contacts 37 and the connections thereto as to switch into circuit with the voltage coils 18 and 31, 32, portions of an inductance or resistance of values as desired.

It is claimed and desired to secure by Letters Patent:

1. In an electric relay apparatus, contact members for controlling an external circuit, a timing element, means for causing movement of said element at a constant rate through a plurality of cycles, a time-delay member supported for movement and for co-action relation with said element and being operable by such co-action to cause operating actuation of said contact members, means operable to impart movement of said time-delay member into co-action relation with said element, and a plurality of elements sequentially operable by the first said means during movement of said element through said cycles for causing movement of said time-delay member into co-action relationship with said timing element.

2. In an electric relay apparatus, contact members for controlling an external circuit, a timing element, means for causing movement of said element at a constant rate through a plurality of cycles, a time-delay member supported for movement in one and another direction into and out of co-action relation with said element to control operating actuation of said contact members, impedance responsive means comprising a current responsive element and a voltage responsive element for causing said movements of said member, the said current responsive element being energized in dependence upon the magnitude of current flowing in an external power circuit and the voltage responsive element being supplied from a source of potential supplied from said power circuit, and a plurality of elements sequentially operable by the first said means during movement of said timing element through said cycles for varying the magnitude of the voltage impressed on the said voltage responsive element for causing said impedance responsive element to impart movement of said time-delay member into co-action relationship with said timing element.

3. In an electric relay apparatus, contact members for controlling an external circuit, a timing element, means for causing movement of said element at a constant rate through a plurality of cycles, impedance responsive means comprising current and voltage responsive elements for initiating operation of said means, a time-delay member supported for movement in one and another direction into and out of co-action relation with said element to control operating actuation of said contact members, impedance responsive means comprising current and voltage responsive elements for causing said movements of said member, the said current responsive elements being energized responsive to and in dependence upon the magnitude of current flowing in an external circuit, an auto-transformer supplied with potential from said external circuit and provided with a plurality of taps for impressing potential on said voltage responsive elements, and a plurality of auxiliary contacts connected respectively with said taps sequentially operable by the first said means during movement of said timing element through said plurality of cycles for progressively reducing the magnitude of the potential impressed on said voltage responsive elements.

4. In an electric relay apparatus, contact members for controlling an external circuit, a timing element, means for causing continuous movement of said element at a constant rate through a plurality of cycles, a time-delay member supported for movement and co-action relation with said element and being operable by such co-action to cause operative actuation of said contact members, means operable to impart movement of said time-delay member into co-action relation with said element, a plurality of elements sequentially operable by the first said means during movement of said element through said cycles for causing movement of said time-delay member into co-action relationship with said timing element, and means operable by the first said means following movement of said timing element through said cycles for controlling said circuit.

JOSEF STÖCKLIN.